US011117045B2

(12) United States Patent
Chiang et al.

(10) Patent No.: US 11,117,045 B2
(45) Date of Patent: Sep. 14, 2021

(54) METHOD FOR PLAYING A HOLD 'EM CARD GAME WITH TWO HANDS

(71) Applicant: 2 HH, LLC, Monterey Park, CA (US)

(72) Inventors: Wayne Chiang, Monterey Park, CA (US); Jarom Severson, San Jose, CA (US)

(73) Assignee: 2 HH, LLC, Monterey Park, CA (US)

(*) Notice: Subject to any disclaimer, the term of this patent is extended or adjusted under 35 U.S.C. 154(b) by 0 days.

(21) Appl. No.: 16/406,771

(22) Filed: May 8, 2019

(65) Prior Publication Data

US 2019/0321715 A1 Oct. 24, 2019

Related U.S. Application Data

(63) Continuation of application No. 14/711,620, filed on May 13, 2015, now abandoned.

(51) Int. Cl.

*A63F 1/00* (2006.01)
*G07F 17/32* (2006.01)
*A63F 13/00* (2014.01)
*A63F 3/00* (2006.01)

(52) U.S. Cl.

CPC ............ *A63F 1/00* (2013.01); *A63F 3/00157* (2013.01); *G07F 17/322* (2013.01); *G07F 17/326* (2013.01); *G07F 17/3262* (2013.01); *G07F 17/3293* (2013.01); *A63F 2001/005* (2013.01)

(58) Field of Classification Search

CPC .. G07F 17/3267; G07F 17/326; G07F 17/322; G07F 17/3293; G07F 17/3262; A63F 3/00157; A63F 1/00; A63F 2001/005

See application file for complete search history.

(56) References Cited

U.S. PATENT DOCUMENTS

| | | | |
|---|---|---|---|
| 5,288,081 | A | 2/1994 | Breeding |
| 5,322,295 | A | 6/1994 | Cabot |
| 7,435,172 | B2 | 10/2008 | Hall |
| 10,249,146 | B1 | 4/2019 | Dawe |

(Continued)

OTHER PUBLICATIONS

Wizard of Odds, Your Guide to Ganbling and Online Casinos (https://wizardofodds.com/).

(Continued)

*Primary Examiner* — Kang Hu
*Assistant Examiner* — Thomas H Henry
(74) *Attorney, Agent, or Firm* — Sheppard Mullin; James Young Hurt

(57) ABSTRACT

A method for playing a hold 'em card game with two hands provides a variant to a standard hold 'em card game by dealing four hole cards to a player, and splitting the hole cards into two sets of hole cards, with each set of hole cards being independently played, bet, raised, or folded in relation to the same community cards. An initial round of wagering occurs, followed by dealing four hole cards to each player. The hole cards are split into two sets of hole cards that are played independently of each other. There is another round of betting, before a turn and a river are also dealt. If the dealer's best of five hands exceeds a poker hand ranking of the player's, the player forfeits the wager. If the player's best of five hands exceeds the dealer's, the player receives an equal amount of units to the wager.

20 Claims, 3 Drawing Sheets

(56) References Cited

U.S. PATENT DOCUMENTS

| | | | | |
|---|---|---|---|---|
| 2002/0145255 | A1* | 10/2002 | Rudolph | G07F 17/32 273/292 |
| 2003/0064767 | A1 | 4/2003 | Brown | |
| 2007/0075494 | A1 | 4/2007 | Abbott | |
| 2007/0138744 | A1 | 6/2007 | Hall | |
| 2008/0179830 | A1* | 7/2008 | Webb | A63F 3/00157 273/274 |
| 2008/0237984 | A1 | 10/2008 | Kling et al. | |
| 2008/0246218 | A1 | 10/2008 | Lopez et al. | |
| 2008/0318651 | A1 | 12/2008 | Gross et al. | |
| 2009/0121435 | A1* | 5/2009 | Schultz | A63F 1/00 273/292 |
| 2010/0252999 | A1 | 10/2010 | Lopez et al. | |
| 2012/0214567 | A1* | 8/2012 | Snow | G07F 17/3225 463/13 |
| 2013/0023335 | A1* | 1/2013 | Snow | G07F 17/3293 463/22 |
| 2014/0120997 | A1 | 5/2014 | Colacone | |
| 2015/0379821 | A1 | 12/2015 | LaDuca | |
| 2016/0332065 | A1 | 11/2016 | Chiang | |

OTHER PUBLICATIONS

International Search Report for PCT Application No. PCT/US2015/067907, dated Feb. 26, 2016, 2 pages.

* cited by examiner

METHOD FOR PLAYING A HOLD 'EM CARD GAME WITH TWO HANDS

CROSS-REFERENCE TO RELATED APPLICATION

This application is a continuation of U.S. patent application Ser. No. 14/711,620, entitled "METHOD FOR PLAYING A HOLD 'EM CARD GAME WITH TWO HANDS" and filed on May 13, 2015, which is hereby incorporated by reference in their entireties for all purposes.

TECHNICAL FIELD

The present invention relates generally to a method for playing a hold 'em card game with two hands, rather than one hand, such that the strategic options and wagering opportunities are increased. More so, a method for playing a hold 'em card game with two hands provides a variant to a standard hold 'em card game by dealing four hole cards to a player, and splitting the hole cards into two sets of hole cards, with each set of hole cards being independently played, bet, raised, or folded in relation to the same community cards; whereby simultaneously playing the two sets of hole cards increases the strategic options and wagering opportunities.

BACKGROUND

It is known that, poker is a card game played for wagering and entertainment purposes. Nearly all poker games use a standard 52-card deck of playing cards (with thirteen values—2, 3, 4, 5, 6, 7, 8, 9, 10, Jack, Queen, King, and Ace—and four different suits: spades, diamonds, clubs, and hearts). Sometimes, one, two, or four "jokers" are added to the deck to serve as "wild cards," which may be used to represent any card of any suit.

In many instances, poker games include the ability to make wagers. However, friendly poker games may be played without wagers, much of the skill and excitement of poker comes from its wagering system. Often, units are wagered. The units can be poker chips or other markers that are used and placed in a central area called a pot. Most poker games begin with an ante, or forced bet, by some or all of the players.

Often, there then follows one or more betting rounds wherein players have the opportunity to check (meaning to refrain from betting) or bet (sometimes up to a certain pre-set limit, and sometimes with no limit) by placing chips in the pot. Other players then have the option to "call" the bet by matching it, raise the bet by placing more chips in the pot, or fold, by surrendering their cards and forfeiting that hand. After the final betting round, if more than one player remains in the game, there is a showdown where the remaining players reveal their cards and the winner is determined by ranking the relative value of the hands, as discussed below.

In one of the most popular forms of poker, there are multiple players who play at a poker table. Quite often in these multiple player games, the object for the player is to have a higher ranking poker hand than all of the other players. In order to participate in the game, the players make wagers which are collected in a common pot. Usually, the first wager by each player is called the Ante wager. During the play of the poker game, various betting rounds occur at which each player may make additional wagers.

Players may also fold at any point in the poker game upon which the player is withdrawing from further participation in that round of the game. Poker games that have more than one betting round can result in much larger common pots. At the end of the round of the game, the player with the best poker hand wins the pot. These multiple player poker games can be played as either draw poker games or stud poker games.

It is known that one popular poker game is Texas Hold 'em. Texas Hold 'em involves each player receiving two hole cards each. After an initial round of wagering, three community cards (known as "the flop") are dealt on the board, followed by another round of wagering. A fourth ("the turn") and a fifth ("the river") card are dealt on the board with a round of wagering after each. Following the final round of wagering, the pot of collected wagers is awarded to the player with the highest ranking hand.

A player's hand is determined by the best five-card poker hand that could be made using neither, either, or both of his hole cards together with an appropriate complement of board cards. Typically, the players in Texas Hold 'em have only one hand of hole cards, i.e., two hole cards, with which to play, bet, or fold.

Thus, an unaddressed need exists in the industry to address the aforementioned deficiencies and inadequacies. Even though the above cited methods for hold 'em card games meets some of the needs of the market, a variation of hold 'em poker that provides the player with two hands for betting, playing, raising, and holding; consequently increasing the strategic options and wagering opportunities is still desired.

SUMMARY

The present invention is directed to a method for playing a hold 'em card game with two hands, such that the strategic options and wagering opportunities are increased. The method for playing a hold 'em card game with two hands, hereafter, "method" provides a variant to a standard hold 'em card game by dealing four hole cards to a player. The four hole cards are then split into two separate sets of hole cards by the dealer. Each set of hole cards may then be independently played, bet, raised, or folded in conjunction with the same community cards to achieve a best of five hand for one or both sets of hole cards.

As discussed above, each set of hole cards is played in conjunction with the community cards to achieve a best of five hands, and thereby reach the overarching goal of having the highest poker hand ranking In this manner, two sets of hole cards are simultaneously played with the same set of community cards to form a best of five hand. The best of five hands is essentially the highest poker hand ranking possible when playing the combinations of the hole cards and the community cards. By using two separate sets of hole cards to form two best of five hands, the strategic playing options and wagering opportunities are greatly increased. Thus, two sets of two cards are played and wagered on individually. However in one alternative embodiment, two of three hole cards are played and wagered. In another alternative embodiment, three of the three hole cards are played and wagered.

In some embodiments, the dealer also receives a hand of three dealer cards, placed face down. Similar to the player's hole cards, the dealer's hand is played in conjunction with the community cards to achieve a best of five hand. The dealer's best of five hand is compared to both hands of the players best of five cards to determine the higher poker hand ranking.

If the dealer's best of five hands exceeds a poker hand ranking of the player's best of five hands, the player forfeits the wagered units. If the player's best of five hands exceeds a poker hand ranking of the dealer's best of five hands, the player receives an equal amount of units to the wagered units.

The method is effective for playing a variant of a hold 'em card game with two hands, simultaneously, and in conjunction with the same set of community cards. In one embodiment, the method is played with a base deck of 52 playing cards, each card having a unique combination of a value selected from a group of thirteen values and a suit selected from a group of four suits.

The method includes an initial Step of wagering an initial wager of two units. The unit used for wagering may include, without limitation, chips, money, or bonus points. In the method, the player competes for an amount of units contributed by multiple players and the dealer to a pot. Because the cards are dealt randomly and outside the control of the players, each player attempts to control the amount of units in the pot based either on the hand they are holding, or on their prediction as to what opposing players and the dealer may be holding.

The method may further comprise a Step of dealing three community cards, the three community cards comprising a flop. The community cards are dealt face up in the center of the table and shared by all players and the dealer. The prior Step is considered a pre-flop, since the wager of two units was made prior to seeing the flop. A Step includes dealing three dealer cards to a dealer, the three dealer cards disposed face down.

In some embodiments, a Step comprises dealing four hole cards to a player, the four hole cards disposed face down. The four hole cards are dealt to every player in the hold 'em game. Only the recipient player can see the hole cards.

A Step includes separating the four hole cards into a first set of hole cards and a second set of hole cards. The dealer separates the four hole cards into two sets of two hole cards. This, in essence creates two separate games for the player, as each set of hole cards is played, bet, folded, or checked independently.

In some embodiments, a Step may include wagering at least one unit on each set of hole cards, and up to three units on either set of hole cards. After the player has viewed the hole cards and the flop of community cards, the player can determine a best of five hand for the first set of hole card sand the second set of hole cards. In this manner, the player attempts to achieve the ideal goal of forming the highest poker hand ranking, or at least bluffing the opposing players into believing that the player A Step comprises dealing a fourth community card, the fourth community card comprising a turn. In one alternative embodiment, the player may wager additional units, fold, or raise after the turn is dealt. A Step includes dealing a fifth community card, the fifth community card comprising a river. In one alternative embodiment, the player may wager additional units, fold, or raise after the river is dealt.

The method may further comprise a Step of determining a best of five hand for the player, wherein the best of five hand for the player comprises the first set of hole cards and the river, and the second set of hole cards and the river. The player may use any combination of hole cards and community cards to form the best of five hand for reaching the highest poker hand ranking.

A Step includes revealing the dealer's three dealer cards. The dealer's cards are then made visible to the player also. In some embodiments, a Step comprises determining a best of five hand for the dealer, wherein the best of five hand for the dealer comprises any two of the three dealer cards and the river from the community cards. Similar to the player's hole cards, the dealer's hand is played in conjunction with the community cards to achieve a best of five hand.

A Step includes comparing the player's best of five hands against the dealer's best of five hand. The dealer's best of five hand is compared to both hands of the players best of five cards to determine the higher poker hand ranking. In some embodiments, a Step may include forfeiting the wagered units if the dealer's best of five hands exceeds a poker hand ranking of the player's best of five hands. A final Step comprises receiving an equal amount of units to the wagered units if the player's best of five hands exceeds a poker hand ranking of the dealer's best of five hands.

One objective of the present method is to increase the strategic possibilities in a variant of a hold 'em card game by providing two sets of hole cards for the player to play in conjunction with the community cards.

Another objective is to increase the wagering opportunities by providing two sets of hole cards that can be wagered on.

Another objective is to remove some of the randomness found in the game of hold 'em and add more strategy by providing two hands to the player.

Another objective is to provide enable progressive wagering as community cards are added to the flop.

Another objective is to provide an entertaining alternative to a traditional Texas Hold 'em card game.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION

Figure 1:
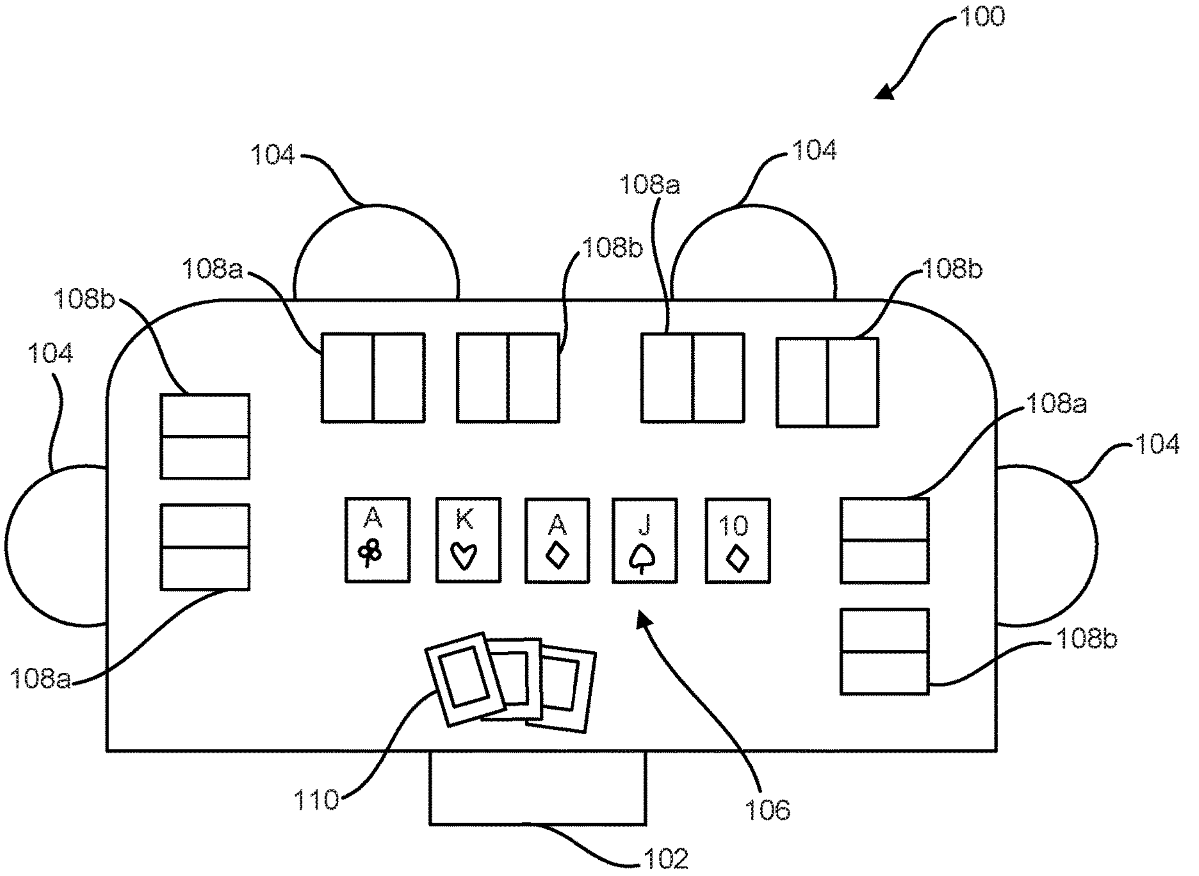
FIG. 1 illustrates a top view of an exemplary hold 'em card game, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2A:
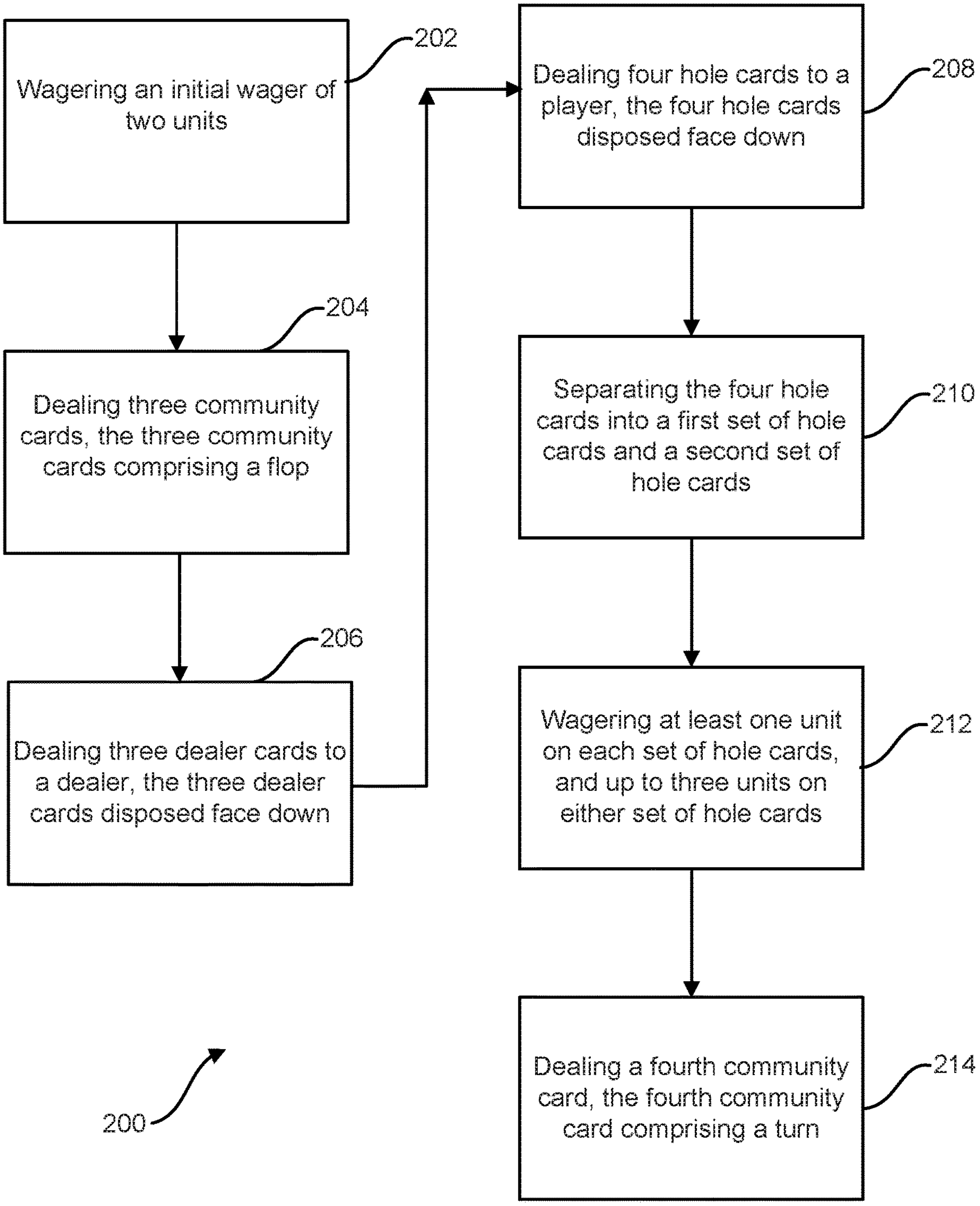
FIGS. 2A and 2B illustrate a flowchart diagram of an exemplary a method for playing a hold 'em card game with two hands, in accordance with an embodiment of the present invention.
Figure 2B:
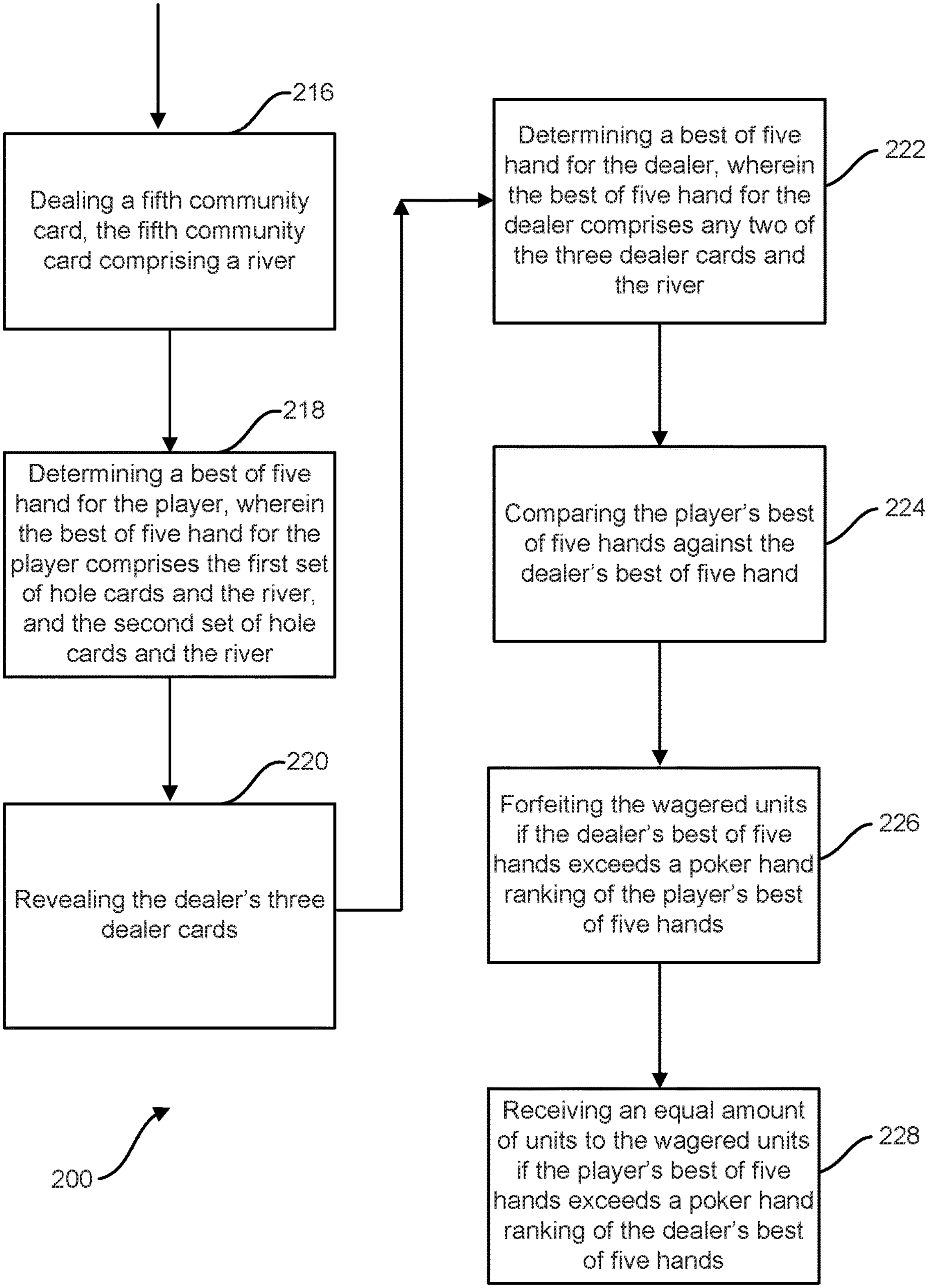

In one embodiment of the present invention presented in FIGS. 1-2B, a method 200 for playing a hold 'em card game 100 with two hands, such that the strategic options and wagering opportunities are increased. The method 200 for playing a hold 'em card game 100 with two hands, hereafter, "method 200" provides a variant to a standard hold 'em card game 100.

In some embodiments, of the method 200 for playing a variant of hold 'em cards with two hands, an initial step comprises the player 104 performing a round of wagering. In one possible embodiment of the wagering order, the player 104 to the dealer's 102 left is forced to wager an amount known as the "small blind," and the player 104 to the left is forced to wager an amount known as the "big blind," usually double the amount of the small blind. Betting then continues around the table, with each player 104 choosing to match the big blind, raise, or fold. However, in other embodiments, different variations of wagering order may be used.

After the first round of betting is complete, the dealer 102 places three community cards 106 face up in the center of the table. These cards, known as the "flop", may be used by any or all of the players 104 remaining in the game 100, along with the dealer 102.

After the initial wager, a dealer 102 deals four hole cards to a player 104, and then splits the four hole cards into two separate sets of hole cards, i.e, a first set of hole cards 108*a*, and a second set of hole cards 108*b*. Each set of hole cards 108*a*, 108*b* may then be independently played, bet, raised, or folded in conjunction with the same community cards 106 to achieve a best of five hand for one or both sets of hole cards 108*a*, 108*b*.

In some embodiments, the method may enable another round of betting, before a fourth community card, the "turn", is added face up to the center. There is then another round of betting before the fifth and final community card, the "river", is placed face up with the others.

Each set of hole cards 108*a*, 108*b* is played in conjunction with the flop, turn, or river community cards 106 to achieve a best of five hands, and thereby reach the overarching goal of having the highest poker hand ranking. In this manner, two sets of hole cards 108*a*, 108*b* are simultaneously played with the same set of community cards 106 to form a best of five hand.

In one embodiment, the best of five hands is essentially the highest poker hand ranking possible when playing the combinations of the hole cards and the community cards 106. However, by using two separate sets of hole cards 108*a*, 108*b* to form two best of five hands, the strategic playing options and wagering opportunities are greatly increased. Thus, two sets of hole cards are played and wagered on individually. However in one alternative embodiment, two of three hole cards are played and wagered. In another alternative embodiment, three of the three hole cards are played and wagered.

In some embodiments, the dealer 102 also receives a hand of three dealer cards 110, placed face down. Similar to the player's 104 hole cards 108*a*, 108*b*, the dealer's 102 hand is played in conjunction with the community cards 106 to achieve a best of five hand. The dealer's 102 best of five hand is compared to both hands of the player's 104 best of five cards to determine the higher poker hand ranking.

Those skilled in the art will recognize that poker games use a standard method 200 of ranking the value of poker hands. The ranking of poker hands is based on rarity, and is as follows (from most valuable to least valuable):

Straight Flush: five cards of the same suit, in order (Q-J-10-9-8 of spades)

Four of a Kind: four cards of the same value, and one extra card (J-J-J-J-7)

Full House: three cards of one value, plus two of another (A-A-A-3-3)

Flush: five cards of the same suit (A-J-9-7-2 of clubs)

Straight: five cards in sequence, Aces may be low or high (9-8-7-6-5)

Three of a Kind: three cards of the same value, and two extra (5-5-5-K-Q)

Two Pair: two cards of one value plus two cards of another (10-10-6-6-Q)

One Pair: two cards of one value, and three extra (A-A-9-5-2)

It is also significant to note that hands higher in the list are more rare (the odds of attaining them are higher), and therefore more valuable and beat hands lower on the list. If more than one player has the same type of hand (e.g. three of a kind), higher cards beat lower cards (Aces are the highest, then Kings, Queens, Jacks, 10s, and so on). So, three Queens beats three Jacks.

The remaining cards in a five-card hand may also be ranked in order if necessary to break ties (Q-Q-Q-A-5 beats Q-Q-Q-K-J, and A-A-K-J-9 beats A-A-K-J-8). Suits are equal, and therefore irrelevant in ranking hands. The highest possible Straight Flush, A-K-Q-J-10 of the same suit, is called a "Royal Flush" or "Royal Straight Flush." In one alternative embodiment, Five of a Kind is possible only with wild cards (or multiple decks), and beats a Straight Flush.

Thus, using the aforementioned poker hand ranking, if the dealer's 102 best of five hands exceeds a poker hand ranking of the player's 104 best of five hands, the player 104 forfeits the wagered units. However, if the player's 104 best of five hands exceeds a poker hand ranking of the dealer's 102 best of five hands, the player 104 receives an equal amount of units to the wagered units. Though, in other embodiments, variations of the winning and losing hands may be used. For example, without limitation, the if the player's 104 best of five hands exceeds a poker hand ranking of the dealer's 102 best of five hands, the player 104 receives double the wagered units.

In one alternative embodiment, there is a final round of betting, and then a showdown if more than one player 104 is still in the game 100, where the player 104 may use one or both of the two sets of hole cards 108*a*, 108*b* face down cards in combination with the five community cards 106 to create the best five hand for achieving the highest poker hand ranking.

In another alternative embodiment, the method 200 is played through a downloadable software application. The method 200 may be stored on a remote server and accessed through the Internet. In another embodiment, the hold 'em game 100 is played on a video game console, a smartphone, and a gaming computer. In yet another embodiment, multiple players in different regions may interactively play against each other and a virtual dealer, such as a chat bot.

FIGS. 2A and 2B illustrate a flowchart diagram of an exemplary method 200 for playing a hold 'em card game 100 with two hands. The method 200 is effective for playing a variant of a hold 'em card game 100 with two hands, simultaneously, and in conjunction with the same set of community cards 106. In one embodiment, the method 200 is played with a base deck of 52 playing cards, each card having a unique combination of a value selected from a group of thirteen values and a suit selected from a group of four suits.

The method 200 includes an initial Step 202 of wagering an initial wager of two units. The unit used for wagering may include, without limitation, chips, money, or bonus points. In the method 200, the player 104 competes for an amount of units contributed by multiple players 104 and the dealer 102 to a pot. Because the cards are dealt randomly and outside the control of the players 104, each player 104 attempts to control the amount of units in the pot based either on the hand they are holding, or on their prediction as to what opposing players 104 and the dealer 102 may be holding.

The method 200 may further comprise a Step 204 of dealing three community cards 106, the three community cards 106 comprising a flop. The community cards 106 are dealt face up in the center of the table and shared by all players 104 and the dealer 102. The prior Step 202 is considered a pre-flop, since the wager of two units was made prior to seeing the flop. A Step 206 includes dealing three dealer cards 110 to a dealer 102, the three dealer cards 110 disposed face down.

In some embodiments, a Step 208 comprises dealing four hole cards 108*a*, 108*b* to a player 104, the four hole cards disposed face down. The four hole cards are dealt to every player 104 in the hold 'em game 100. Only the recipient player 104 can see the hole cards.

A Step 210 includes separating the four hole cards into a first set of hole cards 108*a* and a second set of hole cards 108*b*. The dealer 102 separates the four hole cards 108*a*, 108*b* into two sets of two hole cards 108*a*, 108*b*. This, in essence creates two separate games 100 for the player 104, as each set of hole cards 108*a*, 108*b* is played, bet, folded, or checked independently.

In some embodiments, a Step 212 may include wagering at least one unit on each set of hole cards 108*a*, 108*b*, and up to three units on either set of hole cards 108*a*, 108*b*. After the player 104 has viewed the hole cards 108*a*, 108*b* and the flop of community cards 106, the player 104 can determine a best of five hand for the first set of hole cards 108*a* and the second set of hole cards 108*b*. In this manner, the player 104 attempts to achieve the ideal goal of forming the highest poker hand ranking, or at least bluffing the opposing player 104 into believing that the player 104 has the highest poker hand ranking.

A Step 214 comprises dealing a fourth community card, the fourth community card comprising a turn. In one alternative embodiment, the player 104 may wager additional units, fold, or raise after the turn is dealt. A Step 216 includes dealing a fifth community card, the fifth community card comprising a river. In one alternative embodiment, the player 104 may wager additional units, fold, or raise after the river is dealt.

The method 200 may further comprise a Step 218 of determining a best of five hand for the player 104, wherein the best of five hand for the player 104 comprises the first set of hole cards 108*a* and the river, and the second set of hole cards 108*b* and the river. The player 104 may use any combination of hole cards 108*a*, 108*b* and community cards 106 to form the best of five hand for reaching the highest poker hand ranking.

A Step 220 includes revealing the dealer's 102 three dealer cards 110. The dealer's cards 110 are then made visible to the player 104 also. In some embodiments, a Step 222 comprises determining a best of five hand for the dealer 102, wherein the best of five hand for the dealer 102 comprises any two of the three dealer cards 110 and the river from the community cards 106. Similar to the player's 104 hole cards, the dealer's 102 hand is played in conjunction with the community cards 106 to achieve a best of five hand.

A Step 224 includes comparing the player's 104 best of five hands against the dealer's 102 best of five hand. The dealer's 102 best of five hand is compared to both hands of the player's 104 best of five hand to determine the higher poker hand ranking. In some embodiments, a Step 226 may include forfeiting the wagered units if the dealer's 102 best of five hands exceeds a poker hand ranking of the player's 104 best of five hands. A final Step 228 comprises receiving an equal amount of units to the wagered units if the player's 104 best of five hands exceeds a poker hand ranking of the dealer's 102 best of five hands.

It is significant to note that the method 200 can have different variations of playing that utilize a separate four card bonus, and also enable the dealer 102 to have more flexibility with the dealer 102's hand. This alternative variation further increases the wagering options. For example, in first variation, the player 104 wagers 2 units. The player 104 may then split the four cards into two sets of hole cards, as described above. However, the player 104 may then wager up to an additional 2 more units either or both. Furthermore, the dealer 102 can use up to 2 of the 3 hole cards. And finally, a four card bonus is used as a separate wager.

In another variation, the player 104 wagers 2 units. The player 104 may then split the four cards into two sets of hole cards, as described above. However, the player 104 may then wager up to an additional 2 more units either or both. Furthermore, the dealer 102 can use up to 2 of the 3 hole cards. In this variation, the four card bonus is included in the wager.

In yet another variation, the player 104 wagers 2 units. The player 104 may then splits the four cards into two sets of hole cards, as described above. However, the player 104 may then wager up to an additional 2 more units either or both. This is similar to the above alternative methods 200, except, here, the dealer 102 can use up to 3 of the 3 hole cards. In this variation, the four card bonus is used as a separate wager.

In yet another variation, the player 104 wagers 2 units. The player 104 may then splits the four cards into two sets of hole cards, as described above. However, the player 104 may then wager up to an additional 3 more units either or both. As in the above method 200 the dealer 102 can use up to 3 of the 3 hole cards. In this variation, the four card bonus is used as a separate wager.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What we claim is:

1. A system for playing a hold 'em card game with two hands, comprising:

a first computing device used by a first player of the hold 'em card game with two hands, wherein the first player is in a first location;

a second computing device used by a second player of the hold 'em card game with two hands, wherein the second player is in a second location that is different from the first location; and a remote server in a third location, wherein the first computing device is configured to transmit a first input to the remote server, wherein the first input is indicative of an initial wager from the first player for each of a first hand and a second hand of the hold 'em card game with two hands to the remote server, wherein the second computing device is configured to transmit a second input to the remote server, wherein the second input is indicative of the initial wager from the second player for each of a third hand and a fourth hand of the hold 'em card game with two hands to the remote server, wherein the remote server is configured to transmit a first set of data communications to the first computing device, wherein the first set of data communications is associated with a first set of actions of the hold 'em card game with two hands, wherein the first set of actions includes:

dealing three community cards face up, the three community cards comprising a flop, dealing three dealer cards to a dealer of the hold 'em card game with two hands, the three dealer cards disposed face down, and dealing a first set of four hole cards to the first player, wherein the remote server is further configured to transmit a second set of data communications to the second computing device, wherein the second set of data communications is associated with a second set of actions of the hold 'em card game with two hands, wherein the second set of actions includes:

dealing the three community cards face up, the three community cards comprising a flop, dealing the three dealer cards to the dealer of the hold 'em card game with two hands, the three dealer cards disposed face down, and dealing a second set of four hole cards to the second player, wherein the first computing device is further configured to transmit a third input to the remote server, wherein the third input is indicative of a first player action for the first hand and the second hand, the first player action including viewing the first set of four hole cards and the three community cards, and separating, by the first player, the first set of four hole cards into a first set of two hole cards corresponding to the first hand and a second set of two hole cards corresponding to the second hand, wherein separating the first set of four hole cards is based on (i) viewing the three community cards and (ii) a goal of forming a highest poker hand ranking for at least one of the first and second hands, based on at least a first post-initial wager for the first hand and the second hand, wherein the second computing device is further configured to transmit a fourth input to the remote server, wherein the fourth input is indicative of a second player action for the third hand and the fourth hand, the second player action including viewing the second set of four hole cards and the three community cards, and separating, by the second player, the second set of four hole cards into a third set of two hole cards corresponding to the third hand and a fourth set of two hole cards corresponding to the fourth hand, wherein separating the second set of four hole cards is based on (i) viewing the three community cards and (ii) a goal of forming a highest poker hand ranking for at least one of the third and fourth hands, based on at least a second post-initial wager for the third hand and the fourth hand, wherein the first computing device is further configured to transmit a fifth input to the remote server, wherein the fifth input is indicative of the first post-initial wager that includes at least one multiple of the initial wager on none of, one of, or both of the first set and second set of two hole cards, wherein the second computing device is further configured to transmit a sixth input to the remote server, wherein the sixth input is indicative of the second post-initial wager that include s at least one multiple of the initial wager on none of, one of, or both of the third set and fourth set of two hole cards, wherein the remote server is further configured to transmit a third set of data communications to the first and second computing devices, wherein the third set of data communications is associated with a third set of actions of the hold 'em card game with two hands, wherein the third set of actions includes:

dealing a fourth community card face up, the fourth community card comprising a turn, dealing a fifth community card face up, the fifth community card comprising a river, and revealing the dealer's three dealer cards to the first and second players, wherein the remote server is further configured to determine a best of five hand for the first player for each of the first hand and the second hand and a best of five hand for the second player for each of the third hand and the fourth hand, wherein the best of five hand for the first, second, third and fourth hands comprise a best five-card hand according to a poker hand ranking from among the first, second, third and fourth sets of two hole cards, respectively, and the flop, the turn, and the river, wherein the remote server is further configured to determine a best of five hand for the dealer, wherein the best of five hand for the dealer comprises a best five-card hand according to the poker hand ranking from among the three dealer cards and the flop, the turn, and the river, wherein the remote server is further configured to determine a first set of winning hands comprising none of, one of, or both of the first player's best of five hand for the first hand and the second hand, wherein the determining the first set of winning hands comprises comparing the first player's best of five hand for each of the first hand and the second hand against the dealer's best of five hand to determine a highest poker hand ranking, wherein the remote server is further configured to determine a second set of winning hands comprising none of, one of, or both of the second player's best of five hand for the third hand and the fourth hand, wherein the determining the second set of winning hands comprises comparing the second player's best of five hand for each of the third hand and the fourth hand against the dealer's best of five hand to determine a highest poker hand ranking, wherein the remote server is further configured to transmit a fourth set of data communications to the first computing device, and wherein the fourth set of data communications is indicative of the first set of winning hands, wherein the remote server is further configured to transmit a fifth set of data communications to the second computing device, and wherein the fifth set of data communications is indicative of the second set of winning hands, wherein the remote server is further configured to present to the first player strategic options and wagering opportunities using the initial wager and at least one post-initial wager to maximize an expected value of a return of wagering units, and wherein presentation to the first player of the strategic options and wagering opportunities comprises the first computing device configured to transmit the first player actions, which are representative of a joint optimization, of (i) separating the four hole cards into the first and second set of two hole cards corresponding to the first and second hand after displaying the three community cards, and (ii) the post-initial wager maximizing, before the fourth and fifth community cards are dealt, (a) the expected return over the first hand, or (b) the expected return over the second hand, or (c) the joint expected return over both the first and second hands.

2. The system of claim 1, wherein the first computing device is of a first type, and wherein the second computing device is of a second type that is different from the first type.

3. The system of claim 2, wherein the first computing device and the second computing device are selected from the group consisting of: a smartphone, a gaming computer and a video game console.

4. The system of claim 1, wherein the remote server is further configured to receive, from the first computing device, a seventh input indicative of a third post-initial wager for one or both of the first hand and the second hand after the turn is dealt.

5. The system of claim 4, wherein the remote server is further configured to receive, from the second computing device, an eighth input indicative of a fourth post-initial wager for one or both of the third hand and the fourth hand after the turn is dealt.

6. The system of claim 1, wherein the remote server is further configured to receive, from the first computing device, a seventh input indicative of a third post-initial wager for one or both of the first hand and the second hand after the river is dealt.

7. The system of claim 6, wherein the remote server is further configured to receive, from the second computing device, an eighth input indicative of a fourth post-initial wager for one or both of the third hand and the fourth hand after the river is dealt.

8. The system of claim 1, wherein the remote server is further configured to determine a bonus winnings amount equal to a multiple of the initial wager when at least one predetermined four card poker hand is achieved among the first set of four hole cards or the second set of four hole cards.

9. The system of claim 1, wherein the remote server is further configured to determine a best of five hand for the dealer, wherein the best of five hand for the dealer comprises a best five-card hard according to the poker hand ranking from among at most two out of the three dealer cards and the flop, the turn, and the river.

10. A computer implemented method for playing a hold 'em card game with two hands between a remote server and a first player, using a first computing device at a first location, and a second player, using a second computing device at a second location, through the Internet, the method comprising:

transmitting, from the first computing device to the remote server, a first input that is indicative of an initial wager from the first player for each of a first hand and a second hand of the hold 'em card game with two hands to the remote server;

transmitting, from the second computing device to the remote server, a second input that is indicative of the initial wager from the second player for each of a third hand and a fourth hand of the hold 'em card game with two hands to the remote server;

transmitting, from the remote server to the first computing device, a first set of data communications that is associated with a first set of actions of the hold 'em card game with two hands, wherein the first set of actions includes:

dealing three community cards face up, the three community cards comprising a flop, dealing three dealer cards to a dealer of the hold 'em card game with two hands, the three dealer cards disposed face down, and dealing a first set of four hole cards to the first player;

transmitting, from the remote server to the second computing device, a second set of data communications that is associated with a second set of actions of the hold 'em card game with two hands, wherein the second set of actions includes:

dealing the three community cards face up, the three community cards comprising a flop, dealing the three dealer cards to the dealer of the hold 'em card game with two hands, the three dealer cards disposed face down, and dealing a second set of four hole cards to the second player;

transmitting, from the first computing device to the remote server, a third input that is indicative of a first player action for the first hand and the second hand, the first player action including viewing the first set of four hole cards and the three community cards, and separating, by the first player, the first set of four hole cards into a first set of two hole cards corresponding to the first hand and a second set of two hole cards corresponding to the second hand, wherein separating the first set of four hole cards is based on (i) viewing the three community cards and (ii) a goal of forming a highest poker hand ranking for at least one of the first and second hands, based on at least a first post-initial wager for the first hand and the second hand;

transmitting, from the second computing device to the remote server, a fourth input to the remote server, wherein the fourth input is indicative of a second player action for the third hand and the fourth hand, the second player action including viewing the second set of four hole cards and the three community cards, and separating, by the second player, the second set of four hole cards into a third set of two hole cards corresponding to the third hand and a fourth set of two hole cards corresponding to the fourth hand, wherein separating the second set of four hole cards is based on (i) viewing the three community cards and (ii) a goal of forming a highest poker hand ranking for at least one of the third and fourth hands, based on at least a second post-initial wager for the third hand and the fourth hand;

transmitting, from the first computing device to the remote server, a fifth input that is indicative of the first post-initial wager that includes at least one multiple of the initial wager on none of, one of, or both of the first set and second set of two hole cards;

transmitting, from the second computing device to the remote server, a sixth input that is indicative of the second post-initial wager that includes at least one multiple of the initial wager on none of, one of, or both of the third set and fourth set of two hole cards;

transmitting, from the remote server to the first and second computing devices, a third set of data communications that is associated with a third set of actions of the hold 'em card game with two hands, wherein the third set of actions includes:

dealing a fourth community card face up, the fourth community card comprising a turn, dealing a fifth community card face up, the fifth community card comprising a river, and revealing the dealer's three dealer cards to the first and second players;

determining, by the remote server, a best of five hand for the first player for each of the first hand and the second hand and a best of five hand for the second player for each of the third hand and the fourth hand, wherein the best of five hand for the first, second, third and fourth hands comprise a best five-card hand according to a poker hand ranking from among the first, second, third and fourth sets of two hole cards, respectively, and the flop, the turn, and the river;

determining, by the remote server, a best of five hand for the dealer, wherein the best of five hand for the dealer comprises a best five-card hand according to the poker hand ranking from among the three dealer cards and the flop, the turn, and the river;

determining, by the remote server, a first set of winning hands comprising none of, one of, or both of the first player's best of five hand for the first hand and the second hand, wherein the determining the first set of winning hands comprises comparing the first player's best of five hand for each of the first hand and the second hand against the dealer's best of five hand to determine a highest poker hand ranking;

determining, by the remote server, a second set of winning hands comprising none of, one of, or both of the second player's best of five hand for the third hand and the fourth hand, wherein the determining the second set of winning hands comprises comparing the second player's best of five hand for each of the third hand and the fourth hand against the dealer's best of five hand to determine a highest poker hand ranking;

transmitting, by the remote server to the first computing device, a fourth set of data communications that is indicative of the first set of winning hands; and transmitting, by the remote server to the second computing device, a fifth set of data communications that is indicative of the second set of winning hands, wherein the remote server is further configured to present to the first player strategic options and wagering opportunities using the initial wager and at least one post-initial wager to maximize an expected value of a return of wagering units, and wherein presentation to the first player of the strategic options and wagering opportunities comprises the first computing device configured to transmit the first player actions, which are representative of a joint optimization, of (i) separating the four hole cards into the first and second set of two hole cards corresponding to the first and second hand after displaying the three community cards, and (ii) the post-initial wager maximizing, before the fourth and fifth community cards are dealt, (a) the expected return over the first hand, or (b) the expected return over the second hand, or (c) the joint expected return over both the first and second hands.

11. The method of claim 10, wherein the first computing device is of a first type, and wherein the second computing device is of a second type that is different from the first type.

12. The method of claim 11, wherein the first computing device and the second computing device are selected from the group consisting of: a smartphone, a gaming computer and a video game console.

13. The method of claim 10, further comprising:

determining, by the remote server, a bonus winnings amount equal to a multiple of the initial wager when at least one predetermined four card poker hand is achieved among the first set of four hole cards or the second set of four hole cards.

14. The method of claim 10, further comprising:

determining, by the remote server, a best of five hand for the dealer, wherein the best of five hand for the dealer comprises a best five-card hard according to the poker hand ranking from among at most two out of the three dealer cards and the flop, the turn, and the river.

15. A system for playing a hold 'em card game with two hands, comprising:

a remote server; and a computing device associated with a player of the hold 'em card game with two hands, wherein the computing device is configured to transmit a first input to the remote server, wherein the first input is indicative of an initial wager from the player for each of a first hand and a second hand of the two hand hold 'em card game to the remote server, wherein the remote server is configured to transmit a first set of data communications to the computing device, wherein the first set of data communications is associated with a first set of actions of the two hand hold 'em game, wherein the first set of actions includes:

dealing three community cards face up, the three community cards comprising a flop, dealing three dealer cards to a dealer of the two hand hold 'em card game, the three dealer cards disposed face down, and dealing four hole cards to the player, wherein the computing device is further configured to transmit a second input to the remote server, wherein the second input is indicative of a player action for the first hand and the second hand, the player action including viewing the four hole cards and the three community cards, and separating, by the player, the four hole cards into a first set of two hole cards corresponding to the first hand and a second set of two hole cards corresponding to the second hand, wherein separating the four hole cards is based on (i) viewing the three community cards and (ii) a goal of forming a highest poker hand ranking for at least one of the first and second hands, based on at least a first post-initial wager for the first hand and the second hand, wherein the computing device is further configured to transmit a third input to the remote server, wherein the third input is indicative of the first post-initial wager for the first hand and the second hand, the first post-initial wager including at least one multiple of the initial wager on none of, one of, or both of the first set and second set of two hole cards, wherein the remote server is further configured to transmit a second set of data communications to the computing device, wherein the second set of data communications is associated with a second set of actions of the two hand hold 'em game, wherein the second set of actions includes:

dealing a fourth community card face up, the fourth community card comprising a turn, and dealing a fifth community card face up, the fifth community card comprising a river, wherein the remote server is further configured to transmit a third set of data communications to the computing device, wherein the third set of data communications is associated with a third set of actions of the two hand hold 'em game, wherein the third set of actions includes:

revealing the dealer's three dealer cards to the player, wherein the remote server is further configured to determine a best of five hand for the player for each of the first hand and the second hand, wherein the best of five hand for the first hand comprises a best five-card hand according to a poker hand ranking from among the first set of two hole cards and the flop, the turn, and the river, wherein the best of five hand for the second hand comprises a best five-card hand according to the poker hand ranking from among the second set of two hole cards and the flop, the turn, and the river, wherein the remote server is further configured to determine a best of five hand for the dealer, wherein the best of five hand for the dealer comprises a best five-card hand according to the poker hand ranking from among at most two out of the three dealer cards and the flop, the turn, and the river, wherein the remote server is further configured to determine a set of winning hands comprising none of, one of, or both of the player's best of five hand for the first hand and the second hand, wherein the determining the set of winning hands comprises comparing the player's best of five hand for each of the first hand and the second hand against the dealer's best of five hand to determine a highest poker hand ranking, wherein the remote server is further configured to transmit a data communication to the computing device, and wherein the data communication is indicative of the set of winning hands, wherein the remote server is further configured to present to the first player strategic options and wagering opportunities using the initial wager and at least one post-initial wager to maximize an expected value of a return of wagering units, and wherein presentation to the first player of the strategic options and wagering opportunities comprises the first computing device configured to transmit the first player actions, which are representative of a joint optimization, of (i) separating the four hole cards into the first and second set of two hole cards corresponding to the first and second hand after displaying the three community cards, and (ii) the post-initial wager maximizing, before the fourth and fifth community cards are dealt, (a) the expected return over the first hand, or (b) the expected return over the second hand, or (c) the joint expected return over both the first and second hands.

16. The system of claim 15, wherein the computing device is selected from the group consisting of: a smartphone, a gaming computer and a video game console.

17. The system of claim 15, wherein the remote server is further configured to determine a bonus winnings amount equal to a multiple of the initial wager when at least one predetermined four card poker hand is achieved among the four hole cards.

18. The system of claim 15, wherein the remote server is further configured to determine a best of five hand for the dealer, wherein the best of five hand for the dealer comprises a best five-card hard according to the poker hand ranking from among at most two out of the three dealer cards and the flop, the turn, and the river.

19. The system of claim 15, further comprising:

receiving, by the remote server from the computing device, a fourth input indicative of a second post-initial wager for one or both of the first hand and the second hand after the turn is dealt.

20. The system of claim 15, further comprising:

receiving, by the remote server from the computing device, a fourth input indicative of a second post-initial wager for one or both of the first hand and the second hand after the river is dealt.

* * * * *